United States Patent
Enge

[19]

[11] Patent Number: 6,158,456
[45] Date of Patent: Dec. 12, 2000

[54] VEHICLE REFUELING VALVE

[75] Inventor: Trevor L. Enge, West Bloomfield, Mich.

[73] Assignee: BorgWarner Inc., Troy, Mich.

[21] Appl. No.: 09/301,234

[22] Filed: Apr. 28, 1999

[51] Int. Cl.$^7$ ...................................................... F16K 24/04
[52] U.S. Cl. ............................................. 137/202; 137/43
[58] Field of Search ....................................... 137/43, 202

[56] References Cited

U.S. PATENT DOCUMENTS

| | | |
|---|---|---|
| 5,044,389 | 9/1991 | Gimby . |
| 5,413,137 | 5/1995 | Gimby . |
| 5,687,756 | 11/1997 | VanNatta et al. . |
| 5,809,976 | 9/1998 | Cook et al. ......................... 137/202 X |
| 5,927,315 | 7/1999 | Kim ..................................... 137/202 X |
| 5,934,306 | 8/1999 | Guillemenet et al. .............. 137/202 X |
| 5,992,441 | 11/1999 | Enge et al. ............................... 137/202 |
| 5,996,607 | 12/1999 | Bergsma et al. ........................ 137/202 |

*Primary Examiner*—Gerald A. Michalsky
*Attorney, Agent, or Firm*—Reising, Ethington, Barnes, Kisselle et al.; Greg Dziegielewski

[57] ABSTRACT

A refueling valve for a motor vehicle includes a body connected to the upper wall of a fuel tank in vertical depending relationship thereon and the body has a body top or cover with a vapor exit passage adapted to be connected to a fuel vapor storage canister, a baffle is connected to the valve body intermediate the ends thereof to form a fuel space and a vapor space; the body includes a portion depending from the cover that has a vapor exit port communicating with the vapor space and wherein the vent exit port has a valve seat closed by a valve mounted on one end of a connecting rod that has its opposite end connected to a float within the fuel space and wherein the vapor exit port remains open until the fuel tank is filled and/or fuel slosh in the tank raises the float to close the valve; the connecting rod is directed through a port in the baffle to provide for vapor exhaust across the baffle during tank fill and to restrict fuel bypass into the vapor space during fuel slosh within the tank. In one embodiment a baffle is a transverse wall and in another embodiment the baffle is an inverted cone having a center vapor relief port therein and a peripheral wall formed with fuel return openings.

4 Claims, 2 Drawing Sheets

VEHICLE REFUELING VALVE

TECHNICAL FIELD

This invention relates to refueling valves and more particularly to refueling valves with fuel vapor vents and liquid traps for use with a motor vehicle fuel tank.

BACKGROUND OF THE INVENTION

In the typical fuel vapor vent valve for a motor vehicle fuel tank wherein the valve is adapted to prevent spillage in case of shaking, tilting or rollover of the vehicle, the valve normally opens the fuel tank to an orifice that is connected by a vapor exit passage in the valve body to a vapor hose leading to a fuel vapor storage device. The valve body is commonly made as a one-piece plastic injected molded part that for simplicity of design has a simple direct connection between the orifice and the vapor exit passage. However, this connection has a tendency to collect and pass any liquid fuel issuing from the orifice under pressure from the tank on to the vapor storage canister. The latter contains a fuel vapor absorber such as carbon and any liquid fuel delivered thereto will quickly reduce its vapor adsorbing ability. It is difficult to configure the top of the molded body with a vapor exit passage connection that would somehow trap this liquid after it passes through the orifice and then drain the trapped liquid back to the tank. This is also the case where the valve is omitted and only venting is provided through an orifice in a vent body that mounts on the fuel tank.

As to any such possible fuel drainage back to the tank in the case of a vent assembly having a valve that is adapted to block the orifice on overfill, vehicle shaking, tilting and/or vehicle rollover, there is also the consideration of adversely affecting the operation of the valve as it is required to provide for normal venting operation in an upright position but close under these various circumstances to block exit of fuel from the tank. Any such drainage path for liquid fuel trapped downstream of the orifice can not provide a possible path for fuel vapor to vent around the valve in the normal upright attitude of the tank or allow liquid fuel to escape from the tank when tipped or inverted. An example of such systems is set-forth in U.S. Pat. No. 5,044,389, assigned to the assignee of the present invention.

One solution to such problems is set-forth in U.S. Pat. No. 5,413,137, also assigned to the assignee of the present invention. The fuel vapor vent assembly set-forth in the '137 patent embodies a fuel impervious insert that is adapted to be mounted in such a vent or vent valve body and defines both a vertically oriented vent orifice and a liquid basin extending about the exit of this orifice. A simple cavity formed in the interior of the top of the plastic body co-operates with the basin in the insert to define an expansive chamber elevated above the orifice and this chamber communicates the orifice with a horizontal vapor exit passage in the plastic body adapted to be connected to a vapor storage device. The expansive chamber forms an elevated liquid trap at the exit of the orifice that traps liquid from the venting fuel vapor while permitting venting to continue therethrough and then drains the trapped liquid in the basin back into the tank through the orifice in the insert when the pressure in the fuel tank is relieved. The liquid trapping chamber has a ceiling directly opposite the orifice dead ending the vapor stream issuing therefrom and the vapor exit passage is connected to the expansive chamber at a point above the basin. These features combine to aid in separating any liquid fuel out from the vapor and down into the basin and prevent it from passing on to the vapor exit passage and thence to the vapor storage canister.

While suitable for their intended purpose, the fuel vapor vent assemblies set-forth in the aforesaid prior art patents do not include provision for venting vapor from the tank as the float is closing at the same rate at which the fuel tank is being filled nor do they provide a predetermined vapor dome space within said tank to accommodate vapor pressure increases when the refueling valve is closed. Further, the unitary body arrangement is configured to locate the valve seat close to the tank top and vent openings are located at the base of the unitary body such that they will be immersed in fuel when the tank level reaches the float so that venting will be restricted as the float moves between its normally open position and its normally closed position.

Another fuel vapor vent valve that obviates the aforesaid problem is setforth in U.S. Pat. No. 5,687,756 also assigned to the assignee of the present invention. The valve shown in the '756 patent provides a fuel vapor vent device that will vent vapor during fuel fill at the same rate as the rate of fuel flow into the tank while preventing liquid fuel flow to a fuel vapor storage canister. Such operation is in part provided by a valve body having a vapor exit passage and a liquid inlet passage and the body is connected to the top of a fuel tank in depending relationship therewith and the valve includes a float and a valving element carried by the float and tiltable with respect to the float for compensating for tilt and further characterized by the body further including a vapor exit port adjacent the top and also including a vent tube with a valve seat located below the vapor exit port for preventing liquid fuel particles from entering the vapor exit passage. The vent tube has a length more than one half of that of said body for locating said valve seat at a distance from the upper wall of the fuel tank that will provide for a predetermined vapor dome space within said tank to accommodate vapor pressure increases when the refueling valve is closed. While suitable for its intended purpose, the length of the vent tube is not always suitable for applications in different fuel tank configurations and requires assembly and the valve seat thereon is not isolated from fuel to so as to minimize fuel carryover to a charcoal canister resulting from violent dynamics of fuel in a closed vessel in response to vehicle maneuvers.

Accordingly, an object of the present invention is to provide a fuel vapor control valve configured to be connected vertically within the upper space of a fuel tank and including connections to a charcoal canister and further including a valve body having a float therein with a valve having a sealing surface isolated from fuel and engaging and sealing against a valve seat for preventing fuel flow through a vapor vent port from the valve body and the valve body having an opening configured to direct fuel vapors from the fuel tank to the interior of the valve body the fuel vapor control valve being characterized by a baffle connected to the interior of the valve body separating the valve body into a vapor space and a fuel space and a connecting rod connected to the float and raised therefrom a predetermined distance to isolate a valve element sealing surface from fuel and directed generally vertically through the baffle and a valve element located on the connecting rod within the vapor space and wherein the baffle and connecting rod are configured such that fuel entry into the vapor space will be delayed until the float is displaced by the entry of fuel into the valve body to cause the valve element to seal the valve seat to prevent fuel passage through the vapor vent port during violent vehicle maneuvers.

A further object is to provide such a fuel vapor control valve of wherein the baffle divides the valve body to form an upper chamber and a lower chamber; the fuel inlet openings into the valve body communicating only with said lower chamber and vapor exit openings being formed within the valve body to communicate the vapor dome of a fuel tank with the upper chamber and wherein a skirt on the valve body cover is configured for encompassing the valve seat and the valve element when it is both opened and closed; the valve body having fuel vapor openings therein located outboard of the skirt at a position shielded by the skirt such that the skirt deflects fuel droplets directed through the fuel vapor openings from entering the vapor vent port.

Still another object of the invention is to provide such a fuel vapor control valve having a body dividing baffle therein including a hole for guiding the valve sealing surface isolating connecting rod within the body and for permitting movement of the connecting rod with respect to the baffle.

One feature of the invention is to provide the baffle in the aforesaid vapor control valve as an inverted cone baffle connected to the valve body and including a hole for passage of the valve sealing surface isolating connecting rod there through during closure of the vent valve and the inverted cone baffle operative to deflect fuel particles in the lower chamber from passing through the vapor vent port when said vent valve is open.

Another feature of the invention is to provide the baffle formed as a planar divider wall connected to and directed transversly across the valve body and including a hole for guiding the connecting rod there through during closure of the vent valve and the planar divider wall operatively deflecting fuel in the lower chamber of a valve body from passing through the vapor vent port.

Yet another object of the invention is to provide universal connections between the valve sealing surface isolating connecting rod, the float and the valve element for adjusting the position of the valve element during closure against the valve seat in response to fuel slosh produced by any normal to violent vehicle maneuvers.

A further object is to provide such connections as a first ball joint on the upper end of the float connected to a socket on one end of the connecting rod and the connecting rod including a second ball joint connected to a ball socket on a valve carrier and including a valve element on the valve carrier located by the upper and lower connections to seal a valve seat for preventing vapor escape when the float is raised within the valve body by displacement of liquid flowing into the valve body through the inlets therein.

These and other objects, advantages and features of the present invention will become more apparent from the following description and accompanying drawings wherein:

DETAILED DESCRIPTION OF THE PREFERRED EMBODIMENT

Figure 1:
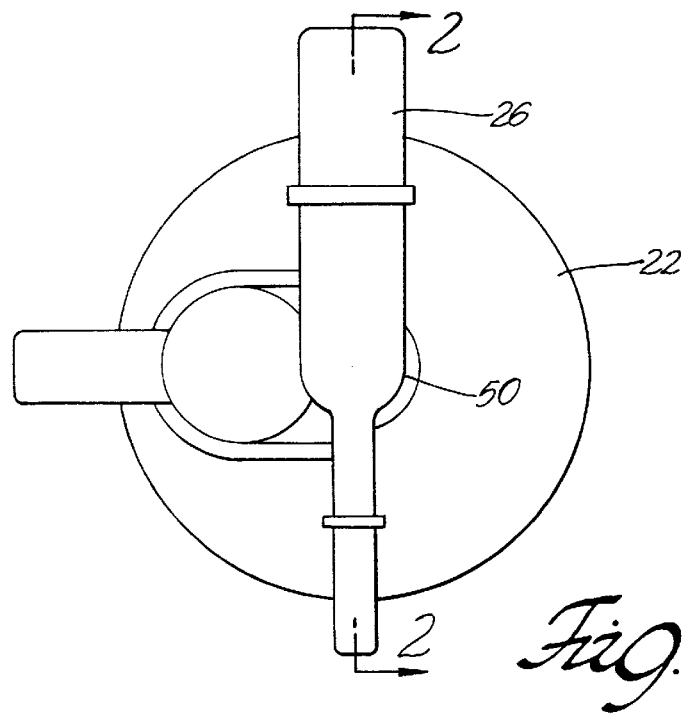
FIG. 1 is a top elevation view of the valve of the present invention.

Referring to FIG. 1, there is illustrated a fuel vapor control valve device 10 for venting a motor vehicle fuel tank 12 to a fuel vapor storage canister 14 containing a fuel absorber such as carbon. The fuel tank 12 is made of high density polyethylene (HDPE).

The valve device 10 comprises body 16 that includes a generally cylindrical upper end 16a that is fit on a cylindrical extension 19 received in an opening 20 in the top of the fuel tank 12. The valve device 10 further comprises a closed upper end cover or top 22 having a radially outwardly extending annular flange 24 that abuts with the tank about the opening 20.

The top 22 is also made of a high density polyethylene (HDPE), this material being selected for its ability to weld to the fuel tank 12 and is merely illustrative with it being understood that other suitable plastic or metallic materials can be used. Thus the flange 24 is welded about its perimeter to the tank to sealingly secure the fuel vapor vent valve device in place in a normal vertically oriented or upright position as shown. The valve body top 22 has an integrally formed hose fitting or outlet tube 26 by which the fuel vapor vent valve device is adapted to be connected by a hose 28 to the vapor storage canister 14.

Mounted in the valve body is a fuel isolated valve assembly including a valve carrier 30, raised connecting rod 32, float 34, valve 36 and a closure member 38 at the bottom end 16b of the valve body 16. A liquid inlet opening 39 is provided in the closure member 38 for communicating the interior of the valve body with the liquid fuel as the tank fills for purposes to be discussed. Also, four vertical slots 41 are annularly located in the valve body 16 around the float 34.

The valve carrier 30 has an annular skirt 30a and an elongated ball socket 40. A ball 42 is provided on the upper end of the raised connecting rod 32 for universally connecting the upper end of the connecting rod 32 to the valve 36. Likewise the lower end of the raised connecting rod 32 has an elongated ball socket 44 that is connected to a ball 45 formed on the upper surface of the float 34 for universally connecting the lower end of the connecting rod 32 to the float 34.

The float 34 is located within the valve body 16 and has a outer wall 34a centered in spaced relationship to the inner wall 16c of the valve body 16.

The valve carrier 30 has an integral valve element 36 formed as a central upstanding valve element with a slightly raised curved elastomeric outer surface 36a aligned with a valve seat 48 formed on the inner surface of the cover 22 at the entrance of a vent tube 50 formed within the cover 22 and defining a vapor exit passage 52. The vent tube 50 receives fuel vapors from the fuel tank from vapor exit ports 54 formed in the upper end 16a of the valve body 16 at a point located closely adjacent the upper wall or inner surface 12a of the fuel tank and at a point that is covered by a vapor flow baffle 56 that covers the valve seat 48 to prevent fuel carry over into the vapor exit passage and hence into the fuel vapor canister 14.

In this embodiment, the float 34 includes an integral end closure disk 58 that will maintain the outer wall 34a of the float 34 in spaced relationship to the inner surface 16c of the valve body 16.

The underside of the closure disk 58 is configured to have a conical surface or ramp 60 that is supported on a ball 62 that is, in turn, supported by the conical inner surface or ramp 64 on the closure member 38.

In the illustrated arrangement, the float and closure disk 58 are heavy enough not to flow shut at low pressure buildups in the fuel tank 12, but are light enough to float in the fuel during a fuel filling operation in which the fuel level is raised in the fuel tank 12 toward the top 12a thereof. The weight of the closure disk 58 is placed such that the float 34 always floats straight up within the valve device 10 thereby to reduce frictional contact between the float 34 and the valve body 16. The angle of ramp of the conical surface 64 is configured such that it will allow the ball 62 to move and shut the valve when the vehicle tilts greater than a predetermined amount, such as in a range of 30°. The ball 62 also has to be heavy enough to close the valve shut when the vehicle rolls over.

In the embodiment of the invention shown in FIG. 1, the bottom closure member 38 includes tabs 38a thereon that are configured to fit into openings 16d on the bottom end 16c of the valve body 16. It includes a liquid inlet opening 39 therein to allow for a substantially unrestricted flow of fuel into the interior of the valve valve body 18 for causing the float 34 to float in response to liquid fuel flow into the tank 12.

In accordance with certain principles of the present invention, the vapor exit passage 52 is configured to be large enough to vent vapors at a rate equal to or greater than the rate of fuel flow into the fuel tank during a filling operation. The communication between the vapor exit ports 54 and the inlet end of the vent tube 50 is selected so that there is no orifice-like restriction there between that can produce over pressurization of the tank during filling. The result is that there is substantially no pressure build up in the fuel tank during the refueling operation due to entrapment of vapor therein. The vapor exit ports 54 are configured and located so that vapor can vent from the tank and out the port or vapor exit passage 52 through an offset flow path defined by the fact that the vent exit ports 54 are located above and laterally of the entrance to the vent tube 50 at the valve seat 48 thereon. The vent exit ports 54 need to be large enough to cause vapors to flow without restriction during the refueling operation. Furthermore, they must be high enough in the tank so that the liquid droplets that might occur in the tank are not able to directly flow from the vapor exit ports 54 to the valve seat 48 during the refueling operation or during tilting or other jousting of the fuel tank 12 thereby to avoid any fuel carryover to the charcoal canister 14 that can affect its vapor absorbing capacity.

Figure 2:
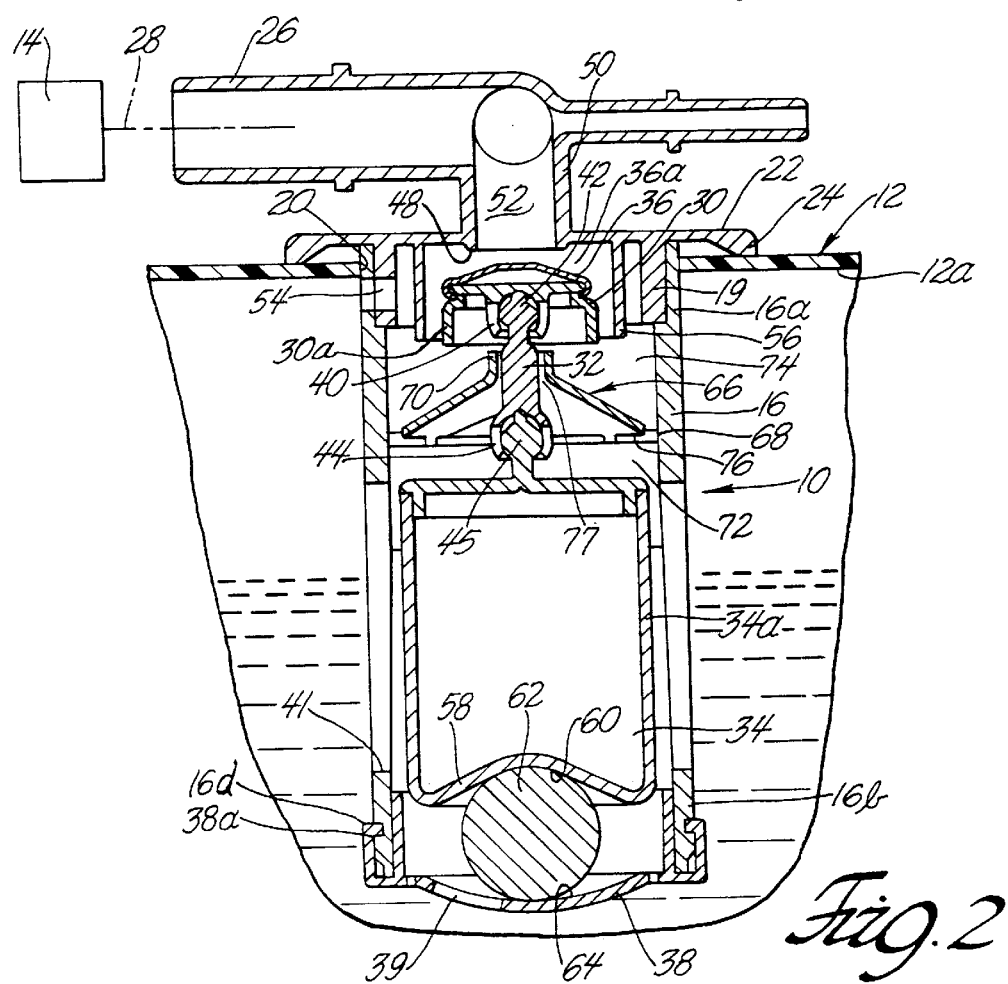
FIG. 2 is a sectional view of a motor vehicle fuel tank vapor control valve associated with a fragmentary section of a fuel tank and the valve including a baffle arrangement and valve assembly constructed in accordance with the present invention.

In the embodiment of FIG. 2, the curved conical configuration of the outer surface 36a of the valve element 36 is selected to restrict vapor flow during closure of the float valve that would otherwise build up pressure in the fuel tank as the fuel moves the float 34 upwardly during a fuel filling operation. The curved shape of the surface 36a is configured so that there is enough pressure build up in the fuel tank 12 to shut the fuel nozzle supplying the fuel tank 12 from the fuel filler pipe even though the float valve is not completely closed. This allows for some of the vapor to vent and drain the fuel in the filler pipe head as the tank reaches its fuel shut off level. Additionally, the curved surface is shifted into a centered relationship with the valve seat center 46 for sealing there across when the roll-over valve is closed by the universal connections defined by the ball joint connections 40, 42 and 44, 46 between the connecting rod 32, the valve carrier 30 and the float 34.

Additionally, the above-described arrangement avoids a sudden build up of pressure in the tank that might otherwise cause a fuel spit back effect at the fill head.

The position of the float, relative to the cover, determines a vapor dome height. The valve seat is positioned as far away from the fuel as possible to prevent liquid fuel from going into the port to the canister.

In this embodiment, another feature is that the valve sealing action is isolated from fuel in the fuel space by the provision of a valve isolating connecting rod 32 that is extended such that the valve sealing surface 36a of the valve element 36 is raised well above the fuel within the bottom of the valve body 16. This isolation is further enhanced by the provision of a baffle 66 formed as an inverted cone having its outer periphery 68 connected to the inner wall 16c of the valve body 16 and having a tubular extension 70 formed at is apex. The baffle 66 divides the interior of the valve body 16 into a lower chamber 72 that is a fuel chamber when the tank is filled with fuel and an upper chamber 74 that is normally separated from the fuel in the tank and that serves as a path for escape of vapor during refueling operations and when the valve element 36 is open. The baffle 66 thus creates a division between the upper and lower chambers 72, 74. Slots 76 are provided in the periphery 68 for vapor flow between the upper and lower chamber 72, 74 and to provide a path for return of any fuel that might enter the upper chamber 74 during dynamic fuel events such as sloshing in a sealed tank during vehicle maneuvers. While shown as an inverted cone, the cone 66 can be formed as a conical shape in which the extension is at the lower end of a cone that diverges upwardly from the cone rather than diverging downwardly from an extension as shown in FIG. 2.

The tubular extension 70 forms a guide hole 77 for the valve isolating connecting rod 32 to provide for free relative movement with respect to the baffle 66 during valve closing and opening movements of the float 34. The guide hole 77 aligns the connecting rod 32 generally vertically within the valve body 16 and also serves as a a path for some venting of fuel vapor during certain phases of valve operation.

The connecting rod 70 in addition to isolating the valve element 36 from the lower chamber 72, serves to transfer the mechanical motion of the float 34 to the valve element 36 while maintaining a predetermined separation distance there between for isolating the valve seat 48 from the lower chamber 72 and hence for isolating the valve sealing function from fuel sloshing movements that will raise and lower the fuel level within the valve body 16 through the liquid or fuel opening 39 through the bottom closure member 38.

In addition to the space isolation provided by the length of the connecting rod and the provision of the baffle, the top cover 22 includes a depending skirt portion defined by the vapor flow baffle 56. As shown in FIG. 2, the skirt 56 encompasses the valve seat 48 and the valve element 36 and the curved outer surface 36 thereon to assist in the isolation of the sealing interface from liquid fuel in the lower chamber 72.

In operation, the significance of the valve device 10 becomes more apparent. During normal to violent movements of fuel in a closed tank due to vehicle maneuvers the fuel sloshing within the tank can cause the float 34 to move up and down within the valve body 16 so as to cause the valve to open and close cyclically due to such fuel slosh. With the present invention when the fuel sloshes, first it will engulf the float area at the lower chamber 72 and close the valve due to upward buoyancy of the float 34 and or the mechanical assist provided by the ball 42 and ramps 60, 64. Since the valve seat 48 and the seat seal defined by the curved outer surface 36a of the valve element 36 are isolated from the fuel affected portion of the valve at the lower chamber 72 the delay of fuel entry from the lower chamber 72 to the upper chamber 74 is delayed and this delay is sufficient to assure that the float and or mechanical action produced during roll over or tipping to shift and hold the valve element 36 tightly sealed against the valve seat 48. Such delay and valve action effectively seals the port or vent tube 50 before any significant fuel flow passes into the upper chamber 74. Following such valve closure and a return of less violent vehicle maneuvers the fuel in the valve will drain to the tank (if less than full) and will return to the lower chamber 72 if the tank is full thereby causing any fuel passing into the upper chamber to drain downwardly through the baffle so that when the float is lowered to open the valve only fuel vapors will be directed into the fuel vapor storage canister 14.

Thus, the valve device 10 is operative to maintain its refueling vapor flow capability while significantly decreasing the potential for liquid fuel carryover.

Figure 3:
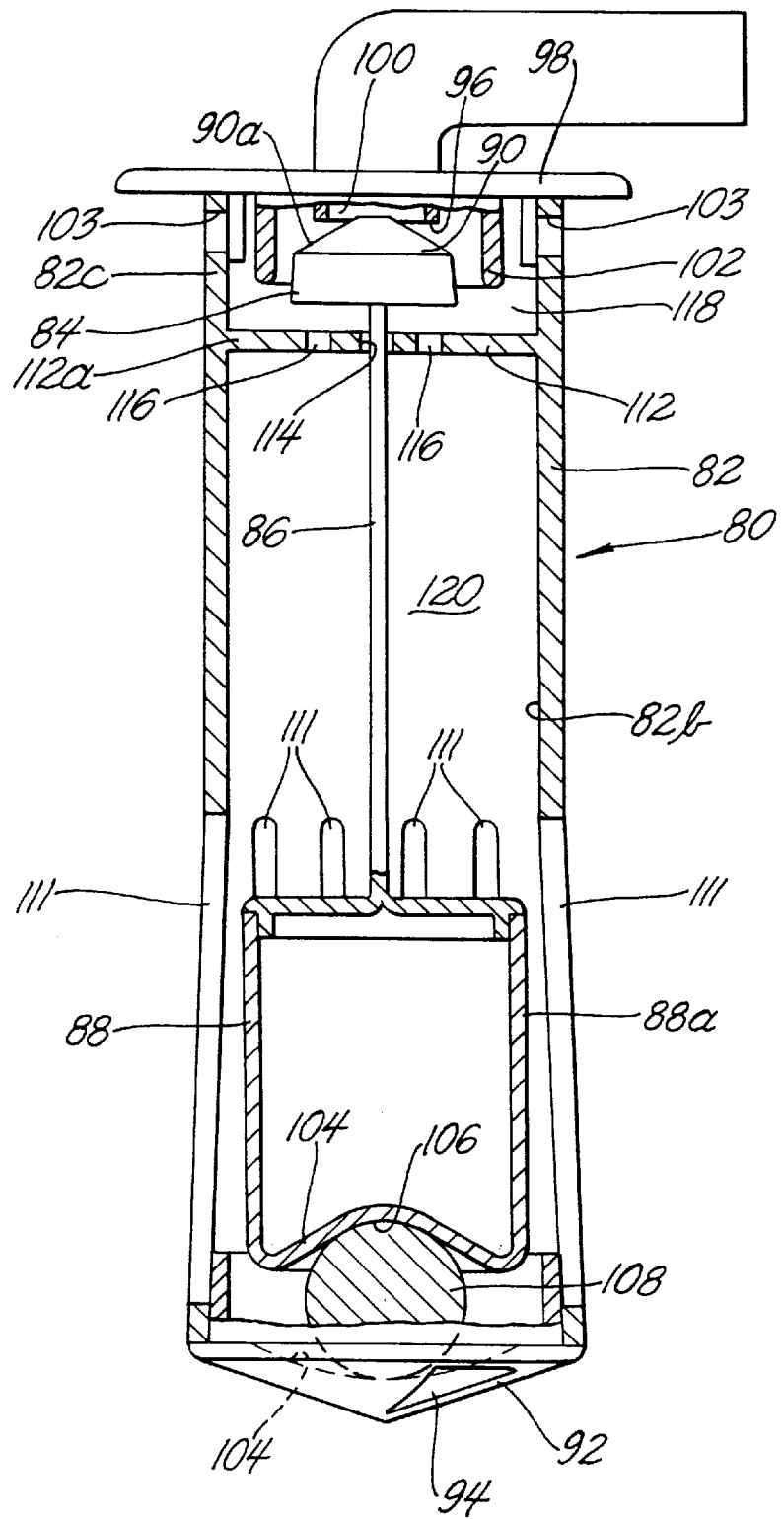
FIG. 3 is a sectional view of a vapor control valve assembly like that shown in FIG. 1 of another embodiment of the invention.

FIG. 3 illustrates another embodiment of the invention including a refueling valve device 80 that includes a valve body 82.

Mounted in the valve body 82 is a fuel isolated valve assembly including a valve carrier 84, raised connecting rod 86, float 88, valve 90 and a closure member 92 at the bottom end 82a of the valve body 82. A liquid inlet opening 94 is provided in the closure member 38 for communicating the interior of the valve body with the liquid fuel as the tank fills as discussed in the aforesaid description of the embodiment of FIGS. 1 and 2.

The upper end of the raised connecting rod 86 is connected to the valve carrier 84. The lower end of the raised connecting rod 86 is connected to the float 88.

The float 88 is located within the valve body 82 and has an outer wall 88a centered in spaced relationship to the inner wall 82b of the valve body 82.

The valve carrier 84 locates the valve element 90 as a central upstanding valve element with a slightly raised curved outer surface 90a aligned with a valve seat 96 formed on the inner surface of a valve cover 98 corresponding functionally to the the cover 22 at the entrance of a vent tube 50 in the first embodiment of FIG. 1. In this embodiment the valve seat 96 surrounds a vent port 100 that is encompassed by a skirt 102 corresponding to the skirt 56 in FIG. 2. The vent port 100 receives fuel vapors from the fuel tank from vapor exit ports 103 formed in the upper end 82c of the valve body 82 at a point located closely adjacent the upper wall of a fuel tank.

In this embodiment, the float 88 includes a closure disk 104 that will maintain the outer wall 88a of the float 88 in spaced relationship to the inner surface 82b of the valve body 82.

The underside of the closure disk 104 is configured to have a conical surface or ramp 106 that is supported on a ball 108 that is, in turn, supported by the conical inner surface or ramp 110 on the closure member 92.

As in the case of the first embodiment of FIGS. 1 and 2, in this embodiment, the float and closure disk are heavy enough not to flow shut at low pressure buildups in the fuel tank, but are light enough to float in the fuel during a fuel filling operation in which the fuel level is raised in the fuel tank toward the top thereof. The weight of the closure disk is placed such that the float 88 always floats straight up within the valve device 80 thereby to reduce frictional contact between the float 88 and the valve body 82. The angle of ramp of the conical surface 110 is configured such that it will allow the ball 108 to move and shut the valve when the vehicle tilts greater than a predetermined amount, such as in a range of 30°. The ball 108 also has to be heavy enough to close the valve shut when the vehicle rolls over.

In the embodiment of the invention shown in FIG. 3, includes a plurality of elongated, circumferentially spaced openings 111 in the valve body 82 to allow for a substantially unrestricted flow of fuel into the interior of the valve body 82 for causing the float 88 to float in response to liquid fuel flow into an associated fuel tank such as tank 12 partially shown in FIG. 2.

In accordance with certain principles of the present invention, the vapor vent port 100 is configured to be large enough to vent vapors at a rate equal to or greater than the rate of fuel flow into the fuel tank during a filling operation. The communication between the vapor exit ports 103 and the vent port 100 is selected so that there is no orifice-like restriction there between that can produce over pressurization of the tank during filling. The result is that there is substantially no pressure build up in the fuel tank during the refueling operation due to entrapment of vapor therein. The vapor exit ports 103 are configured and located so that vapor can vent from the tank and out the port 100 through an offset flow path defined by the fact that the vent exit ports 103 are located above and laterally of the entrance to the vent port 100 at the valve seat 96. The vent exit ports 103 need to be large enough to cause vapors to flow without restriction during the refueling operation. Furthermore, they must be high enough in the tank so that the liquid droplets that might occur in the tank are not able to directly flow from the vapor exit ports 103 to the valve seat 96 during the refueling operation or during tilting or other jousting of the fuel tank thereby to avoid any fuel carryover to the charcoal canister such as canister 14 shown in FIG. 2 that can affect its vapor absorbing capacity.

In the embodiment of FIG. 3, the curved conical configuration of the outer surface 90a of the valve element 90 is selected to restrict vapor flow during closure of the float valve that would otherwise build up pressure in the fuel tank as the fuel moves the float 34 upwardly during a fuel filling operation. The curved shape of the surface 90a is configured so that there is enough pressure build up in the fuel tank to shut the fuel nozzle supplying the fuel tank from the fuel filler pipe even though the float valve is not completely closed. This allows for some of the vapor to vent and drain the fuel in the filler pipe head as the tank reaches its fuel shut off level. Additionally, the curved surface 90a in this embodiment is somewhat more conical than in the first embodiment such that its shape will cause the valve element 90 to be shifted into a centered relationship with the valve seat center 96 for sealing there across when the refueling valve is closed.

Additionally, the above-described arrangement avoids a sudden build up of pressure in the tank that might otherwise cause a fuel spit back effect at the fill head.

The position of the float, relative to the top cover, determines a vapor dome height. The valve seat is positioned as far away from the fuel as possible to prevent liquid fuel from going into the port to the canister.

In this embodiment, another feature is that the valve sealing action is isolated from fuel in the fuel space by the provision of a valve isolating connecting rod 86 that is extended such that the valve sealing surface of the valve element 90 is raised well above the fuel within the bottom of the valve body 82. This isolation is further enhanced by the provision of a baffle 112 formed as a wall connected to the inner wall 82b at the upper end 82c of the valve body 82. More particularly the outer periphery 112a of the baffle 112 is connected to the inner wall 82b of the valve body 82 and has a center hole 114 therein through which the connecting rod 86 is directed. The baffle 112 also includes fuel drain holes 116 therein that are located at circumferentially spaced points around the center hole 114. As in the first embodiment, the baffle 112 divides the interior of the valve body 82 into upper vapor chamber 118 and a lower chamber 120 that is a fuel chamber when the tank is filled with fuel. The upper chamber 118 is normally separated from the fuel in the tank and that serves as a path for escape of vapor during refueling operations and when the valve element 90 is open. The baffle 112 thus creates a division between the upper and lower chambers 118, 120. The center hole 114 and drain holes 116 serve to direct vapor flow between the upper and lower chamber 118, 120 and to provide a path for return of any fuel that might enter the upper chamber 118 during dynamic fuel events such as sloshing in a sealed tank during vehicle maneuvers as described in the operation of the first embodiment.

The center hole 114 guides the valve isolating connecting rod 86 to provide for free relative movement with respect to the baffle 112 during valve closing and opening movements of the float 88. The center hole 114 aligns the connecting rod 86 generally vertically within the valve body 82 and also serves as a path for some venting of fuel vapor during certain phases of valve operation.

The connecting rod 86 in addition to isolating the valve element 90 from the lower chamber 120, serves to transfer the mechanical motion of the float 88 to the valve element 90 while maintaining a predetermined separation distance there between for isolating the valve seat 96 from the lower chamber 120 and hence for isolating the valve sealing function from fuel sloshing movements that will raise and lower the fuel level within the valve body 82 through the liquid or fuel openings 111 therein and through the opening 94 in the bottom closure member 92.

In addition to the space isolation provided by the length of the connecting rod and the provision of the baffle, the top cover 98 includes the depending skirt portion 102 defining a vapor flow baffle. As shown in FIG. 3, the skirt 102 encompasses the valve seat 96 and the valve element 90 to assist further in the isolation of the sealing interface from liquid fuel in the lower chamber 120.

The operation of this embodiment generally corresponds to the description of operation for the embodiment of FIGS. 1 and 2. In the embodiment of FIG. 3, during normal to violent movements of fuel in a closed tank the float 88 moves up and down within the body 82 so as to cause the valve to open and close cyclically due to such fuel slosh. When the fuel sloshes, first it will engulf the float area at the lower chamber 120 and close the valve due to upward buoyancy of the float 88 and or the mechanical assist provided by the ball 108 and ramps 106, 110. Since the valve seat 96 and the seat seal defined by the curved outer surface 90a of the valve element 90 are isolated from the fuel affected portion of the valve at the lower chamber 120 the delay of fuel entry from the lower chamber 120 to the upper chamber 118 is delayed and this delay is sufficient to assure that the float and or mechanical action produced during roll over or tipping to shift and hold the valve element 90 tightly sealed against the valve seat 96. Such delay and valve action effectively seals the port 100 before any significant fuel flow passes into the upper chamber 118. Following such valve closure and a return of less violent vehicle maneuvers the fuel in the valve will drain to the tank (if less than full) and will return to the lower chamber 120 if the tank is full thereby causing any fuel passing into the upper chamber to drain downwardly through the baffle so that when the float is lowered to open the valve only fuel vapors will be directed into the fuel vapor storage canister.

The invention has been described in an illustrative manner with respect to two embodiments, and it is to be understood that the terminology that has been used is intended to be in the nature of words of description rather than of limitation. Obviously, many modifications and variations of the present invention in light of the above teachings may be made. For example, the invention has been illustrated as adapted to a refueling valve assembly wherein the valve is operated with a hollow float but the valve could also be operated with another type of floatation device such as a cellular foam member having sufficient buoyancy. It is therefore to be understood that within the scope of the appended claims, the invention may be practiced otherwise than as specifically shown and described.

What is claimed is:

1. A fuel vapor control valve configured to be connected vertically within the upper space of a fuel tank and including connections to a charcoal canister and further including a valve body having a float in a fuel chamber opening and closing a vent valve thereon for engaging and sealing against a valve seat at a sealing chamber having a vapor vent port from the valve body and the valve body having an inlet opening configured to direct fuel vapors from the fuel tank to the interior of the valve body characterized by:

a baffle secured to said valve body to divide said valve body into upper and lower chambers; said lower chamber defining the fuel chamber and said upper chamber defining the sealing chamber; a connecting rod configured to isolate said valve element from fuel entering said lower chamber and to delay fuel entry into the said upper chamber until the float is displaced by the entry of fuel into said fuel chamber to cause the valve element to seal the valve seat to prevent fuel bypass through the vapor vent port; said connecting rod universally connected between the float and said connecting rod for adjusting the closed position of said valve element with respect the said valve seat; said float having a first ball joint on the upper end thereof; a connecting rod having opposite ends; a first socket on one of said opposite ends connected to said first ball joint and providing a lower universal connection there between; said connecting rod including a second ball joint on the other of said opposite ends; a valve carrier having a second socket thereon connected to said second ball joint for providing an upper universal connection there between; said valve element located on said valve carrier located by the upper and lower universal connections to sealingly engage the valve seat for preventing vapor escape when the float is raised within the valve body by displacement of liquid flowing into the valve body through the inlets therein.

2. A fuel vapor control valve configured to be connected vertically within the upper space of a fuel tank and including connections to a charcoal canister and further including a valve body having a float in a fuel chamber opening and closing a vent valve thereon for engaging and sealing against a valve seat at a sealing chamber having a vapor vent port from the valve body and the valve body having an inlet opening configured to direct fuel vapors from the fuel tank to the interior of the valve body characterized by:

a baffle secured to said valve body to divide said valve body into upper and lower chambers; said lower chamber defining the fuel chamber and said upper chamber defining the sealing chamber; a connecting rod configured to isolate said valve element from fuel entering said lower chamber and to delay fuel entry into the said upper chamber until the float is displaced by the entry of fuel into said fuel chamber to cause the valve element to seal the valve seat to prevent fuel bypass through the vapor vent port; said baffle formed as a cone baffle connected to the valve body and including a guide hole for passage of said connecting rod there through during closure of said vent valve and said cone baffle operatively deflecting fuel in said lower chamber from passing through said vapor vent port when said vent valve is open.

3. A fuel vapor control valve configured to be connected vertically within the upper space of a fuel tank and including connections to a charcoal canister and further including a valve body having a float in a fuel chamber opening and closing a vent valve thereon for engaging and sealing against a valve seat at a sealing chamber having a vapor vent port from the valve body and the valve body having an inlet opening configured to direct fuel vapors from the fuel tank to the interior of the valve body characterized by:

a baffle secured to said valve body to divide said valve body into upper and lower chambers; said lower chamber defining the fuel chamber and said upper chamber defining the sealing chamber; a connecting rod configured to isolate said valve element from fuel entering said lower chamber and to delay fuel entry into the said upper chamber until the float is displaced by the entry of fuel into said fuel chamber to cause the valve element to seal the valve seat to prevent fuel bypass through the vapor vent port; said baffle including a central hole for guiding said connecting rod for relative movement of said connecting rod with respect to said baffle; said baffle formed as an inverted cone baffle connected to the valve body and including said central hole for passage of said connecting rod there through during closure of said vent valve and said inverted cone baffle operatively deflecting fuel in said lower chamber from passing through said vapor vent port when said vent valve is open.

4. A fuel vapor control valve configured to be connected vertically within the upper space of a fuel tank and including connections to a charcoal canister and further including a valve body having a float in a fuel chamber opening and closing a vent valve thereon for engaging and sealing against a valve seat at a sealing chamber having a vapor vent port from the valve body and the valve body having an inlet opening configured to direct fuel vapors from the fuel tank to the interior of the valve body characterized by:

a baffle secured to said valve body to divide said valve body into upper and lower chambers; said lower chamber defining the fuel chamber and said upper chamber defining the sealing chamber; a connecting rod configured to isolate said valve element from fuel entering said lower chamber and to delay fuel entry into the said upper chamber until the float is displaced by the entry of fuel into said fuel chamber to cause the valve element to seal the valve seat to prevent fuel bypass through the vapor vent port; said connecting rod universally connected between the float and said connecting rod for adjusting the closed position of said valve element with respect the said valve seat; said baffle formed as an inverted cone baffle connected to the valve body and including said central hole for passage of said connecting rod there through during closure of said vent valve and said inverted cone baffle operatively deflecting fuel in said lower chamber from passing through said vapor vent port when said vent valve is open.

* * * * *